Dec. 29, 1936.   H. W. LEAVITT   2,065,901
MOWING ATTACHMENT FOR TRUCKS
Filed July 27, 1935   2 Sheets-Sheet 1

Harry W. Leavitt
INVENTOR.

BY A. B. McCall
ATTORNEYS.

Dec. 29, 1936. H. W. LEAVITT 2,065,901
MOWING ATTACHMENT FOR TRUCKS
Filed July 27, 1935 2 Sheets-Sheet 2
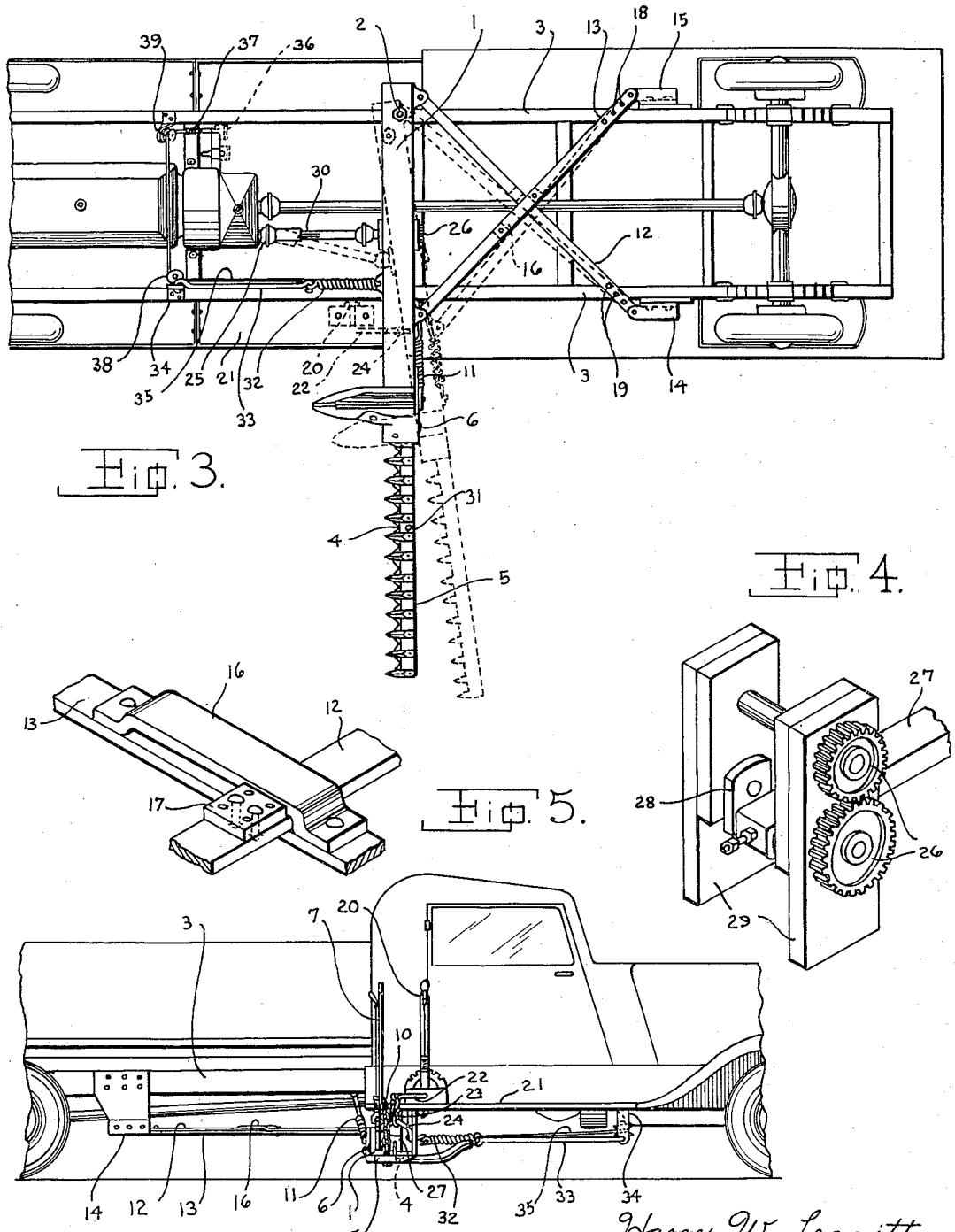
Harry W. Leavitt
INVENTOR.
BY A.B. McCall
ATTORNEYS.

Patented Dec. 29, 1936

2,065,901

UNITED STATES PATENT OFFICE 2,065,901

MOWING ATTACHMENT FOR TRUCKS

Harry W. Leavitt, Hammond, Ill., assignor to Frank E. Thompson, Pierson Station, Ill.

Application July 27, 1935, Serial No. 33,426

2 Claims. (Cl. 56—25)

My invention relates to mowing attachments and mowers for cutting grass, weeds and grain and more especially to mowers for cutting grass and weeds along the highway; an object being in my device to provide a machine for the purposes mentioned to be secured to a highway maintenance truck or other trucks that could be conveniently used in conjunction with a mowing attachment.

A particular purpose of my invention is to provide a mowing attachment for highway maintenance trucks so that the driver of the truck may with convenience cut the grass or weeds along the side of the highway slab or along the side of the driving surface of the highway when desired and when the job is completed remove the attachment and store it away.

I attain the objects of my invention by the device described in the annexed specification, recited in the claims and illustrated in the accompanying drawings in which like reference numerals indicate like parts in the several figures.

Referring to the drawings:

Fig. 3 is a bottom view of a truck with my mowing attachment secured thereto.

Fig. 4 is a detail of the driving gears for my mowing attachment.

Fig. 5 is a detail showing the manner in which the cross arms of my invention are slideably connected where they cross over each other when holding my mowing attachment in operative position on a truck.

Fig. 6 is a side elevation of a truck showing one of the locations of my mowing sickle and frame and showing the location of the frame lifting lever when it is supported on the running board of a truck.

Figure 1:
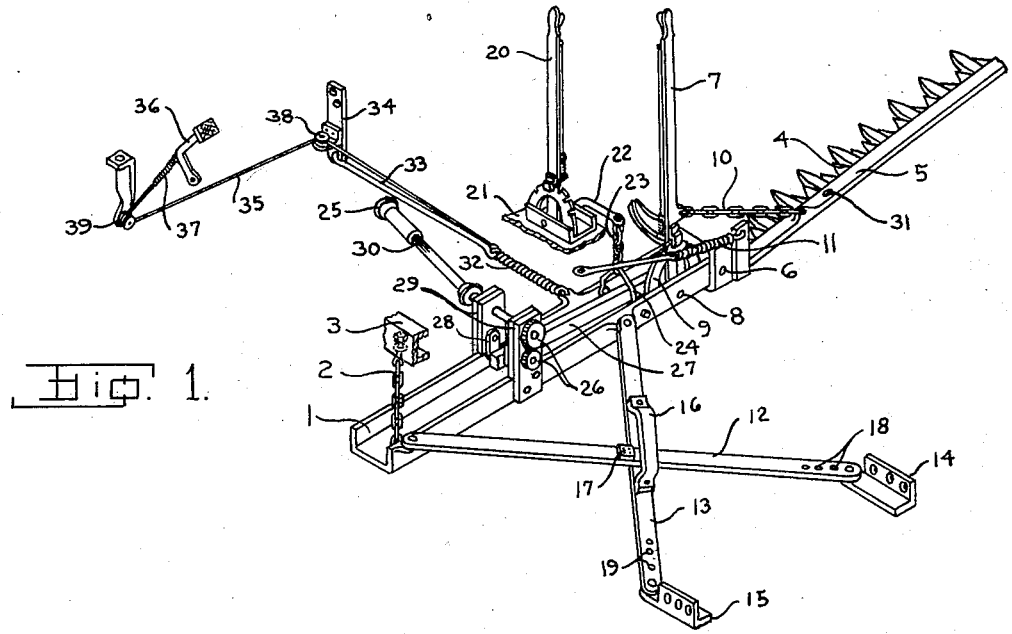
Fig. 1 is a perspective of my invention showing the salient features thereof.
Figure 2:
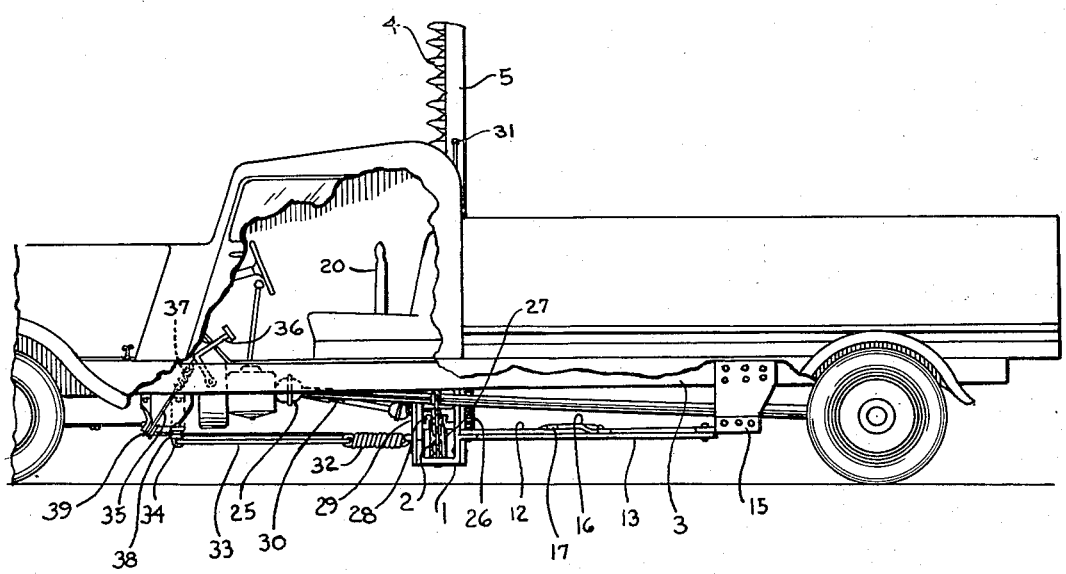
Fig. 2 is a side elevation of a truck with my invention operatively mounted thereon.

Referring in detail to the construction of my invention and the preferred arrangement for operating the same, it may be suggested that I do not wish to be limited in the precise operative location for my mowing attachment, it being evident at the outset that my device could be successfully operated on the front of a truck or behind a truck as well as to work successfully from under the middle portion of the truck where it will be described in its operation in this specification.

It is obvious that my claims will also be not limited to the precise construction and operative location illustrated in the drawings inclosed herewith.

I accomplish the purposes of my invention by this invention which I have already made and tried out on a truck wherein a cross frame member 1 is suspended by a chain 2 under a truck frame 3 shown in part along one side while frame 1 extends across to the opposite side of the truck where sickle 4 operating in cutter frame 5 is pivotally supported on the outer end of frame 1 on a supporting pin 6.

This cutter frame 5 may be lifted pivotally to an upright position by lever 7 which is pivotally supported on pin 8 to operate in holding gears 9.

This means of attachment between lever 7 and cutter frame 5 is through a chain 10 which affords cutter frame 5 flexibility in its movements while a resiliency in its movements is afforded by spring 11 secured to frame 1.

In order to allow frame 1 a substantial support in under the truck and at the same time a freedom of movement from a horizontal to a back swing position within limits, I have provided a pair of crossed bracing arms 12 and 13 adapted to be secured by plates 14 and 15 respectively to a truck body or the chassis of the truck beneath the body; while arm 13 has a guard or loop 16 adapted to hold these two arms slidably when the mower is in operation. The movements permitted in these cross arms operating with frame 1 may be varied by stop member 17 adjustably secured to arm 12 to change the limits of movement of arm 13 forwardly on arm 12 while the holding plates 14 and 15 may be adjusted in holes 18 and 19 for different size trucks or truck bodies.

It will be observed that when frame 1 is in operative position where it works from the middle portion of a truck as is illustrated, then control lever 20 may be operatively secured to a running board 21 in a convenient location for the driver of the truck to manipulate where if necessary he can raise or lower the end of frame 1 that is supporting the cutter 5 by raising or lowering with lever 20 arm 22 and chain 23 which hooks to frame 1 by yoke 24.

The universal joint 25 for the control of my mowing attachment for trucks is adapted to be operatively connected with the power take off of a truck engine so that by this means gears 26 may be rotated for the control of driving rod 27 operated with crank 28 supported on bracket members 29 of frame 1.

As frame 1 swings a little perhaps in the operation of sickle 4 it is obvious that the slidable adjustment 30 in the power take off structure will permit necessary adjustment in the power connection without difficulty; while a variation in the respective sizes of the two gears 26 may be desired to vary the speed of driving rod 27 for sickle 4.

It will be noted that when it is desired to hold cutter frame 5 uprightly when not in use, then a rod secured to frame 1 may be detachably secured to cutter frame 5 in hole 31.

It will be noted that a spring 32 secured to the forward side of frame 1 preferably adjacent lifting hook 24 is adapted to be operatively secured by rod 33 to the frame or engine 34 of the car somewhere forward of frame 1. The purpose of this spring 32 is to give a resilient resistance to the tendency for cutter frame 5 to swing backward as the truck moves along when it hits an obstacle in its path.

However, one of the features of novelty of my invention is to be found in the fact that a cable 35 connected to frame 1 near the connection of spring 32 therewith establishing an effective connection with clutch pedal 36 of the truck engine through a spring 37 adapted to give cable 35 a resilient connection with pedal 36 preferably through pulleys 38 and 39.

The salient feature of this part of my invention is to provide means for stopping the truck automatically if cutter frame 5 should strike an obstacle that might break it if the truck went too far without the notice of the driver.

This cable works very effectively and is practical in its operation since, when cutter frame 5 hits an obstacle giving it a back swing stretching spring 32 the cable 35 is pulled on by frame 1 and through its action in being thus pulled it has a tendency to pull forward on clutch pedal 36 of the truck motor through spring 37, thus releasing the driving engagement of the truck motor with truck body bringing the truck to a stop.

When this happens spring 37 will probably not be stretched to its limit and the driver will usually find it possible to reach down and pull back on clutch pedal 36 until he gets the car in gear again after which he will thus find it possible to back the truck up away from the obstacle hit by cutter frame 5, permitting this cutter frame to be lifted by the driver either by manipulating lever 7 to lift cutter frame 5 or lever 20 to lift frame 1 and cutter frame 5 or both to get away from the obstacle.

It is obvious that lever 20 for lifting frame 1 should be placed on the running board of a truck and that both lever 7 and lever 20 should be within the quick and convenient reach of the driver.

It is not my desire to be limited in the operative position for my mowing attachment for the reason that there may be situations where it could operate better at the front of a truck or at the rear of a truck but I have set forth in this description the operating characteristics of my mowing attachment which are shown to be novel and practical in every respect.

Having thus described the nature of my invention, what I claim is:

1. A mowing attachment for trucks comprising a frame secured to the truck, a mowing sickle operatively adapted to pivot to the frame off to one side of the truck a power take off operatively secured to the frame and adapted to be controllably connected with the motor of said truck, gears, a crank connected therewith and a driving rod establishing operative connection between said sickle and said power take off, a lever on said frame for pivotally lifting said sickle, a second lever adapted to be secured to the running board of said truck and operatively connected with said frame for optionally lifting the frame and the sickle together, a pair of crossed arm members for attaching the frame to a truck body, means for changing the limit of movement of said arms, a chain suspension for said frame adjacent the end opposite said sickle, a forward spring secured to the frame adjacent the sickle supported end thereof and means for securing said spring to said truck, a cable secured to the frame adjacent the point where said spring is secured and operatively supported on said truck in a manner securing the same to the forward side of the foot pedal of said truck clutch, a spring establishing connection between said cable and said clutch pedal, whereby when said sickle mounting strikes an obstacle when in operation, said forward spring on the frame tends to resiliently hold the sickle mounting against an excessive back swing and whereby when such an obstacle is hit without notice of the driver, said cable will automatically pull forward on said clutch pedal releasing the truck engine from the control of the truck so that the truck may come to a stop.

2. A mowing attachment for trucks comprising a frame, a sickle operatively secured to the end of the frame, a power take off attachment operatively connected to the frame and a driving rod establishing a control connection from said power take off to said sickle; gears connected with said power take off and a crank and a gear establishing operative connection between the first gear and said driving rod; means for operatively securing said attachment to a truck, a forward spring for resiliently holding said sickle when it strikes an obstacle, a lever secured to the frame adjacent the sickle for pivotally lifting the sickle to an upright position, rod means for holding the sickle uprightly when desired, a second lever adapted to be operatively mounted on a truck running board convenient to the driver for optionally lifting said sickle and the frame at the end on which the sickle is supported, a cable secured to said frame adjacent the end supporting the sickle and resiliently secured to said truck clutch pedal from the front thereof, through supporting means; whereby when said sickle encounters an obstacle unnoticed by the driver, then the back swing of the sickle, as the truck moves forward, will cause said cable to move the clutch pedal forward releasing the engine from its forward pull on the truck.

HARRY W. LEAVITT.